US012625787B2

(12) United States Patent
Winterberg et al.

(10) Patent No.: US 12,625,787 B2
(45) Date of Patent: May 12, 2026

(54) CHANNEL WARNINGS ON DEVICE INSERTION ISSUES

(71) Applicant: DELL PRODUCTS L.P., Round Rock, TX (US)

(72) Inventors: Douglas Winterberg, York, SC (US); Bhyrav Mutnury, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 17 days.

(21) Appl. No.: 18/747,821

(22) Filed: Jun. 19, 2024

(65) Prior Publication Data

US 2025/0390401 A1     Dec. 25, 2025

(51) Int. Cl.
*G06F 11/22* (2006.01)
*G06F 11/32* (2006.01)

(52) U.S. Cl.
CPC ...... *G06F 11/2221* (2013.01); *G06F 11/2252* (2013.01); *G06F 11/327* (2013.01); *G06F 2201/83* (2013.01)

(58) Field of Classification Search
CPC ............. G06F 11/2221; G06F 11/2252; G06F 11/327; G06F 2201/83
See application file for complete search history.

(56) References Cited

U.S. PATENT DOCUMENTS

| | | | | |
|---|---|---|---|---|
| 4,192,451 | A | * | 3/1980 | Swerling ............... G06F 11/261 |
| | | | | 714/28 |
| 8,636,526 | B2 | * | 1/2014 | Funamura .............. H01R 13/64 |
| | | | | 439/137 |
| 9,443,115 | B2 | | 9/2016 | Berke et al. |
| 2008/0257960 | A1 | * | 10/2008 | Jin ........................ G06K 7/0008 |
| | | | | 235/441 |
| 2014/0257828 | A1 | * | 9/2014 | Thornley ............ G06F 11/0784 |
| | | | | 705/2 |
| 2016/0232069 | A1 | * | 8/2016 | Thornley .............. G06F 11/263 |
| 2019/0057006 | A1 | * | 2/2019 | Boyapalle ........... G06F 11/3452 |
| 2021/0173007 | A1 | * | 6/2021 | Landman ............... G06N 3/006 |
| 2022/0163587 | A1 | * | 5/2022 | Froelich ........... G01R 31/31813 |
| 2022/0206485 | A1 | * | 6/2022 | Qadri ................. G05B 23/0283 |
| 2025/0130925 | A1 | * | 4/2025 | H N ...................... G06F 11/368 |

* cited by examiner

*Primary Examiner* — Ashish Thomas
*Assistant Examiner* — Indranil Chowdhury
(74) *Attorney, Agent, or Firm* — Larson Newman, LLP

(57) ABSTRACT

An information handling system configured to perform an input/output (I/O) health check of the I/O device and gather I/O health check data from the I/O health check performed and calculate channel margins based on the I/O health check data. The information handling system is further configured to determine whether there is an outlier among the channel margins and when there is an outlier, then generate a signature associated with the outlier. In addition, the information handling system is configured to compare the signature with signatures from a library of known issues and determine if there is a match between the signature and one of the signatures from the library, then inform a user of a known issue.

20 Claims, 3 Drawing Sheets

300

Information Handling System

302 Processor

304 Processor

334 Video Display

320 Memory

322

310 306

Chipset 308 332

330 336 Graphics Interface

312

340 NVRAM
342 BIOS/ EFI

392

370 I/O Interface

350 Disk Controller

376 TPM

380 Network Interface

374 Add-On Resource

372

356 ODD

352

354 HDD

390 BMC

394

382

360 Disk Emulator 364 362

Solid State Drive

CHANNEL WARNINGS ON DEVICE INSERTION ISSUES

FIELD OF THE DISCLOSURE

The present disclosure generally relates to information handling systems, and more particularly relates to channel warnings on device insertion issues.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system configured to perform an input/output (I/O) health check of the I/O device and gather I/O health check data from the I/O health check performed and calculate channel margins based on the I/O health check data. The information handling system is further configured to determine whether there is an outlier among the channel margins and when there is an outlier, then generate a signature associated with the outlier. In addition, the information handling system is configured to compare the signature with signatures from a library of known issues and determine if there is a match between the signature and one of the signatures from the library, then inform a user of a known issue.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

In general, information handling systems include a processing device, a memory device for storing computer code that when executed by the processor, causes the information handling system to perform various operations on data, and a data storing device for storing the data. Memory modules are often configured on a circuit card, often referred to as a Dual In-Line Memory Module (DIMM). The information handling system includes various other pluggable circuit cards, such as Peripheral Component Interconnect (PCI) cards, DIMMs, etc. Certain information handling system devices, such as processing devices and pluggable circuit cards, generally plug into a connector slot or socket. The connector slot typically includes several metal connectors for contacting corresponding connector pads on the devices.

Interface margins, also referred to as channel margins, are becoming sensitive to incorrect seating of information handling system devices, such as DIMMs and central processing units (CPUs) in their respective sockets. The devices that do not make full contact with connectors of a connector slot or socket, whether due to incorrect seating in the socket, bent contact elements, debris interrupting the contact, or the like, may experience different channel characteristics. For example, a device may experience higher contact impedance or an increased insertion loss, thereby reducing channel margins. Debris, such as thermal grease and dust, can be deposited on a contact surface of the sockets during assembly. This can also affect the performance of the socket and/or channel margins. However, there is currently no mechanism to track seating conditions, contact issues, and/or insertion issues of these devices. Accordingly, the present disclosure provides a system and method to deliver Double Data Rate (DDR) channel warnings associated with the seating conditions, contact, and/or insertion issues of DIMMs and/or CPUs among other devices.

Figure 1:
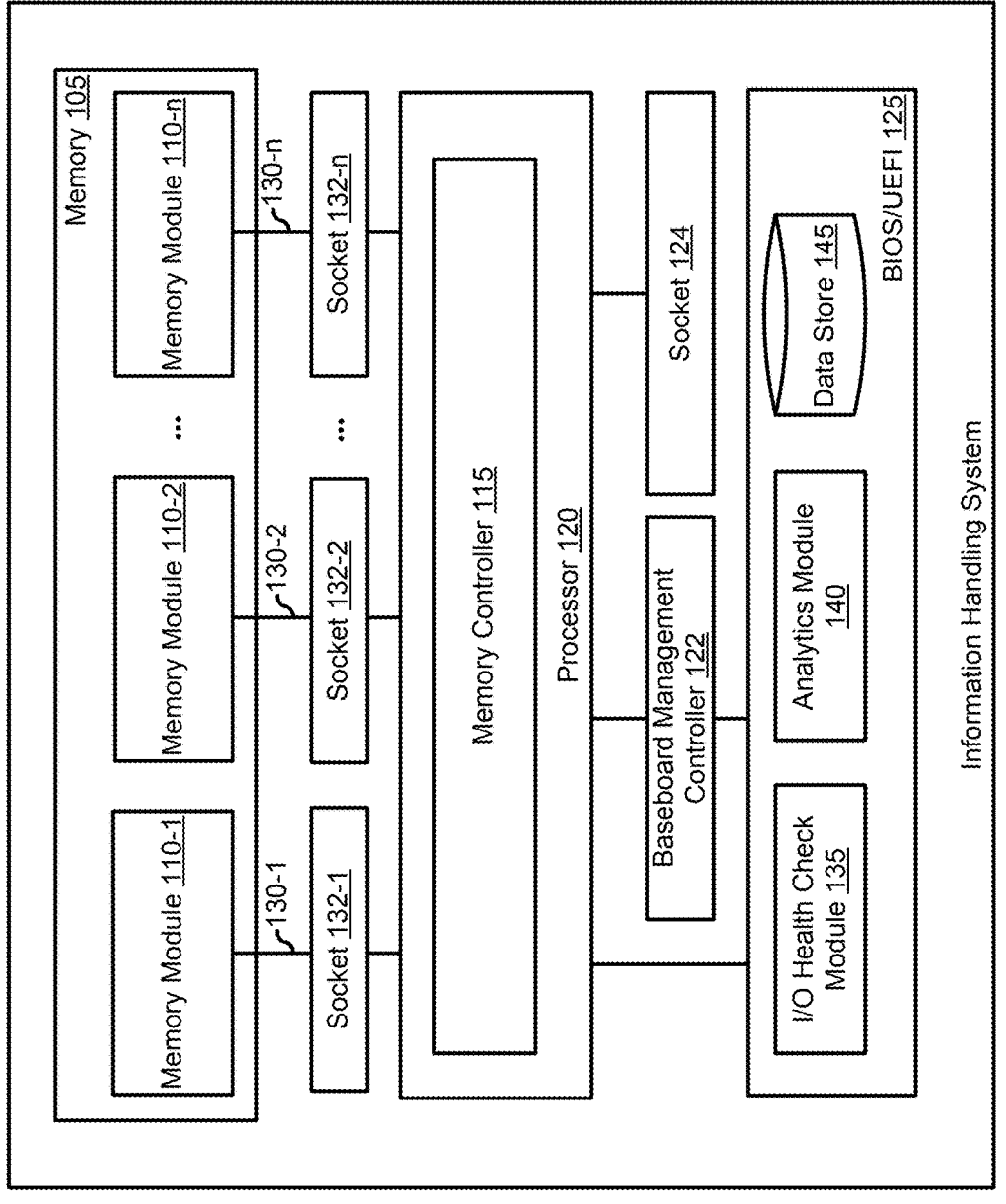
FIG. 1 is a block diagram of an information handling system, according to an embodiment of the present disclosure.

FIG. 1 shows a portion of an information handling system 100, according to an embodiment of the present disclosure. Information handling system 100, which is similar to information handling system 300 of FIG. 3, includes a memory 105, a processor 120, a basic input and output system/Unified Extensible Firmware Interface (BIOS/UEFI) 125, a baseboard management controller (BMC) 122, a socket 124, and sockets 132-1 through socket 132-$n$. BIOS/UEFI 125 includes an I/O health check module 135, an analytics module 140, and a data store 145. Memory 105 includes memory modules 110-1 through 110-$n$. Processor 120 includes a memory controller 115. Memory controller 115 may be coupled with memory modules 110 via memory channels 130-1 through 130-$n$. Memory controller 115, memory 105 with memory modules 110, and memory channels 130 may be referred to as a memory subsystem. Processor 120 is communicatively coupled to BIOS/UEFI 125 and BMC 122. However, any variety of connections between memory modules 110, processor 120, BMC 122, and BIOS/UEFI 125 are envisioned as falling within the scope of the present disclosure.

Figure 3:
FIG. 3 is a block diagram of an information handling system, according to an embodiment of the present disclosure.

Memory 105, which is similar to memory 320 of FIG. 3, may comprise any system, device, or apparatus operable to retain program instructions or data for a period of time and may represent a main memory of information handling system 100. Memory 105 includes memory modules 110 may be comprised of fifth generation double data rate (DDR5) or sixth generation DDR (DDR6) DIMMs. Alternatively, memory modules 110 may comprise of single in-line memory modules (SIMMs), Small Outline DIMMs (SODIMM), MicroDIMMs, Compression Attached Memory Modules (CAMM), or any other type of memory module. Memory modules 110 may be coupled to sockets 132, which may be DIMM or SIMM sockets. For example, memory module 110-1 may be coupled to socket 132-1 while memory module 110-2 may be coupled to socket 132-2. In particular, sockets 132 may include electrical contracts that are configured to mate with pins of memory modules 110.

Memory modules 110 and sockets 132 may be configured to utilize various features of Joint Electron Devices Engineering Council (JEDEC) standard or future standards for various memory types and sockets, respectively. Each memory module may be communicatively coupled to memory controller 115 via memory channels 130. Memory channels 130 may be configured to support one, two, three, or more sockets per channel. Further, although three channels are shown, fewer channels or additional channels may be communicatively coupled to memory controller 115. Each one of memory channels 130 may include a command/ address/control bus (CMD/ADR), a clock for timing of signals on a CMD/ADR line, a data (DQ) bus, and a data strobe (DQS) for the signals on the DQ bus. Accordingly, memory channels 130 may be configured to carry data and command signals between the memory controller 115 and memory 105. Sockets 132 may conform to the DDR DIMM standards, such as DDR5/DDR6 DIMM standards by the JEDEC. The sockets may also conform to a future JEDEC standard, another memory standard, or a proprietary design.

Processor 120, which is similar to processors 302 and 304 of FIG. 3, may comprise of any system, device, or apparatus operable to interpret and/or execute program instructions and/or process data, microcontroller, digital signal processor, application-specific integrated circuit, or any other digital signal processor, application specific integrated circuit, or any other digital or analog circuitry configured to interpret and/or execute program instructions and/or process data stored in memory 105 and/or another component of information handling system 100. In one example, processor 120 may be a CPU. Processor 120 may be coupled to socket 124, which provides a mechanical and electrical connection between processor 120 and a printed circuit board (PCB).

Memory controller 115 may be any system, device, or apparatus configured to manage data storage and retrieval operations from memory 105. In particular, memory controller 115 may represent a portion of information handling system 100 that operates to manage the flow of information to memory modules 110. For example, memory controller 115 may be configured to read data from and/or write data to memory modules 110. Memory controller 115 and memory modules 110 may operate in accordance with a memory architecture implemented on information handling system 100. For example, memory controller 115 and memory modules 110 may operate in accordance with a DDR standard such as a JEDEC DDR5 or DDR6 standard. It will be understood that, where memory controller 115 and memory modules 110 operate in accordance with a different DDR standard, then memory controller 115 and memory modules 110 may be configured to provide different numbers of separate memory channels as compared to FIG. 1 without varying from the scope of this disclosure. In addition, although memory controller 115 is shown as a component of processor 120, memory controller 115 may be separate from processor 120 and/or maybe an integral portion of another component of information handling system 100. For example, memory controller 115 may be integrated into memory 105.

BIOS/UEFI 125, which is similar to BIOS/EFI module 342 of FIG. 3, may include any system, device, or apparatus configured to identify, test, and/or initialize information handling resources of information handling system 100, and/or initialize interoperation of information handling system 100 with other information handling systems. "BIOS" may broadly refer to any system, device, or apparatus configured to perform such functionality, including without limitation, a UEFI. Accordingly, for purposes of this disclosure, extensible firmware interface (EFI) and unified EFI (UEFI) are used interchangeably and called UEFI for simplicity. Also, as used herein, legacy BIOS, as well as BIOS/UEFI, are referred to as BIOS for simplicity.

In some embodiments, BIOS/UEFI 125 may be implemented as a program of instructions that may be read by and executed on processor 120. In these and other embodiments, BIOS/UEFI 125 may comprise boot firmware configured to be the first code executed by processor 120 when information handling system 100 is booted and/or powered on. For example, BIOS/UEFI 125 may be configured to initialize memory 105 in a predefined manner according to JEDEC specification at power on of information handling system 100. In particular, BIOS/UEFI 125 may operate to execute a memory reference code that reads information related to the configuration and capabilities of memory modules 110 and sets up the operating properties of memory modules 110 and of memory controller 115 to ensure proper operation of memory controller 115 and memory modules 110. For example, BIOS/UEFI 125 may be configured to perform command/address write leveling to allow memory controller 115 to compensate for skew. Further, BIOS/UEFI 125 may be configured to perform write/read training which includes leveling data (DQ) and data strobe (DQS) signal classes. The write/read training may also include reference voltage (Vref) training to determine a range of Vref values where a memory interface is stable. In addition, the write/read training includes calibration of delay registers.

I/O health check module 135 may be configured to provide monitoring and health check operations for various I/O types within information handling system 100, such as a Peripheral Component Interconnect-Express (PCIe), serial Advanced Technology Attachment (SATA), DDR5, DDR6, etc. In particular, I/O health check module 135 may be configured to collect various operating parameters that are set up for different I/O interfaces by BIOS/UEFI 125 during a system boot phase to determine a health status of information handling system 100 and its components. For example, in the context of DDR interfaces, I/O health check module 135 may be configured to monitor the memory initialization process as performed by the memory reference code during the system boot phase. The parameters that are monitored may include command/address bus write leveling, data bus read/write training, or other parameters, such as timing margins, read/write voltage margins, temperature margins, or the like.

It has been understood in the present disclosure that as the speed of high-speed data communication interfaces, such as memory channels 130, increases, interface margins are becoming increasingly sensitive to incorrect seating of DIMMs and CPUs in their respective sockets. For example, a damaged socket may cause an increased insertion loss which can reduce interface margins. In addition, debris can be deposited in the sockets during assembly which can also affect the interface margins. When the interface margins are affected, signal integrity of information handling systems can also be impacted.

A designer of an information handling system may create a library of known issues associated with DIMM or CPU socket insertion and their "signatures" during a new product introduction (NPI) phase of the information handling system. This library may be stored in a main library at a laboratory of a manufacturer of the information handling system. In addition, a copy of the library may be stored in the BIOS of each of the information handling systems by the manufacturer. During the NPI phase, commonly faced issues associated with I/O device insertion to its socket, such as bad seating, poor mating, debris, damaged pins, etc. are created through laboratory testing or simulations to capture the signatures of channel margins and/or outliers among the channel margins that were determined during the simulations. For example, data on the channel margins, such as I/O, temperature, voltage, and timing margins for each of the simulated issues may be collected and stored in a library. For example, debris in a DIMM socket, a bent pin, or improper seating may each be simulated among other issues.

In one particular example, a simulated issue may include a memory module having a bent pin. As such, I/O data transmission may have instances of data dropout because the memory module is not properly seated to its socket. Because of this few DQ lanes, such as TxDQ1 and/or TxDQ2 may have a low timing margin or a low voltage margin. In another simulated issue, a socket associated with the memory module has thermal grease. Accordingly, one or more of the DQ lanes may be affected. The DQ lanes affected in this scenario may be different than in the first scenario. For example, in this scenario, TxDQ1 may have a low timing margin or a high temperature margin. As such, each simulation may be associated with a different "signature." A signature may be a globally unique identifier (GUID), a hash value based on the margins associated with the issue, a data structure that includes the said margins, and a digital signature stored in the data structure.

When an issue is detected with an information handling system based on an I/O health check, such as when an outlier in the channel margins is detected, an analytics module, such as analytics module 140 may compare a current signature of the issue with signatures associated with a library of known issues to determine if there is a match. When a match is found, analytics module 140 may identify a cause, provide a warning to a user, and recommend a solution or steps on how to debug the issue associated with the signature. However, when the current signature does not have a match, the detected issue may be identified as a new issue. The new issue may be provided to a service technician for root cause analysis. The new issue and associated current signature along with the root cause may be added to the library. The new issue may also be associated with a warning and a solution along with steps to debug in the library. The new issue may be imported to the BIOS and added to its library of known issues for the next I/O health check.

In a particular embodiment, data from I/O health check module 135 may be utilized throughout the lifecycle of information handling system 100. For example, I/O health check module 135 may be routinely invoked, such as during any system boot phase of information handling system 100. I/O health check module 135 may also be periodically invoked, such as once a week, once a month, or another period as needed or desired, or may be otherwise invoked during the lifecycle of information handling system 100 to gather data for information handling system 100. The I/O health status data from I/O health check module 135 may be provided to BMC 122, which is similar to BMC 390 of FIG. 3. A service technician may analyze the I/O health data provided to BMC 122 and generate a new signature based on the I/O health data. The new signature may be added to the library of signatures, imported to BIOS/UEFI 125, and stored in data store 145.

Analytics module 140 may be configured to retrieve I/O health check data associated with memory 105, processor 120, and/or other I/O devices of information handling system 100. For example, analytics module 140 may collect data on a plurality of parameters indicative of memory modules 110, processor 120, and/or other devices that are seated in a socket. The data collected may be stored in data store 145. Analytics module 140 may calculate one or more margins based on the I/O health check data. Analytics module 140 may be configured to determine whether there are outliers in the margins, such as where there is a delta that is greater than a predefined limit that is considered a healthy memory module. The predefined limit may be set based on the platform DDR technology of memory modules 110, DDR channel and speed, processor type, etc.

If there is an outlier, then the I/O health check data may be analyzed to generate a current signature for each of the devices based on one or more outlying margins. For example, analytics module 140 may generate a signature associated with an outlying margin and another signature for processor 120 if it is associated with another outlying margin. Analytics module 140 may also be configured to compare the current signature with one or more signatures associated with commonly faced issues in the library, such as bad seating, poor mating, debris, a damaged pin, etc. The signature may also be associated with the root cause of the issue, a warning, how to debug the issue and other information. These signatures may be generated in a laboratory setting using one or more simulations during a new product introduction phase and stored in data store 145. The signatures may also be updated based on real-world scenarios after the memory modules 110 and processor 120 have been introduced in the market. Analytics module 140 may be configured to provide in-service diagnostics of memory 105, processor 120, and/or other devices seated on sockets based on a match found during the signature comparison.

Those of ordinary skill in the art will appreciate that the configuration, hardware, and/or software components of information handling system 100 depicted in FIG. 1 may vary. For example, the illustrative components within information handling system 100 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 2:
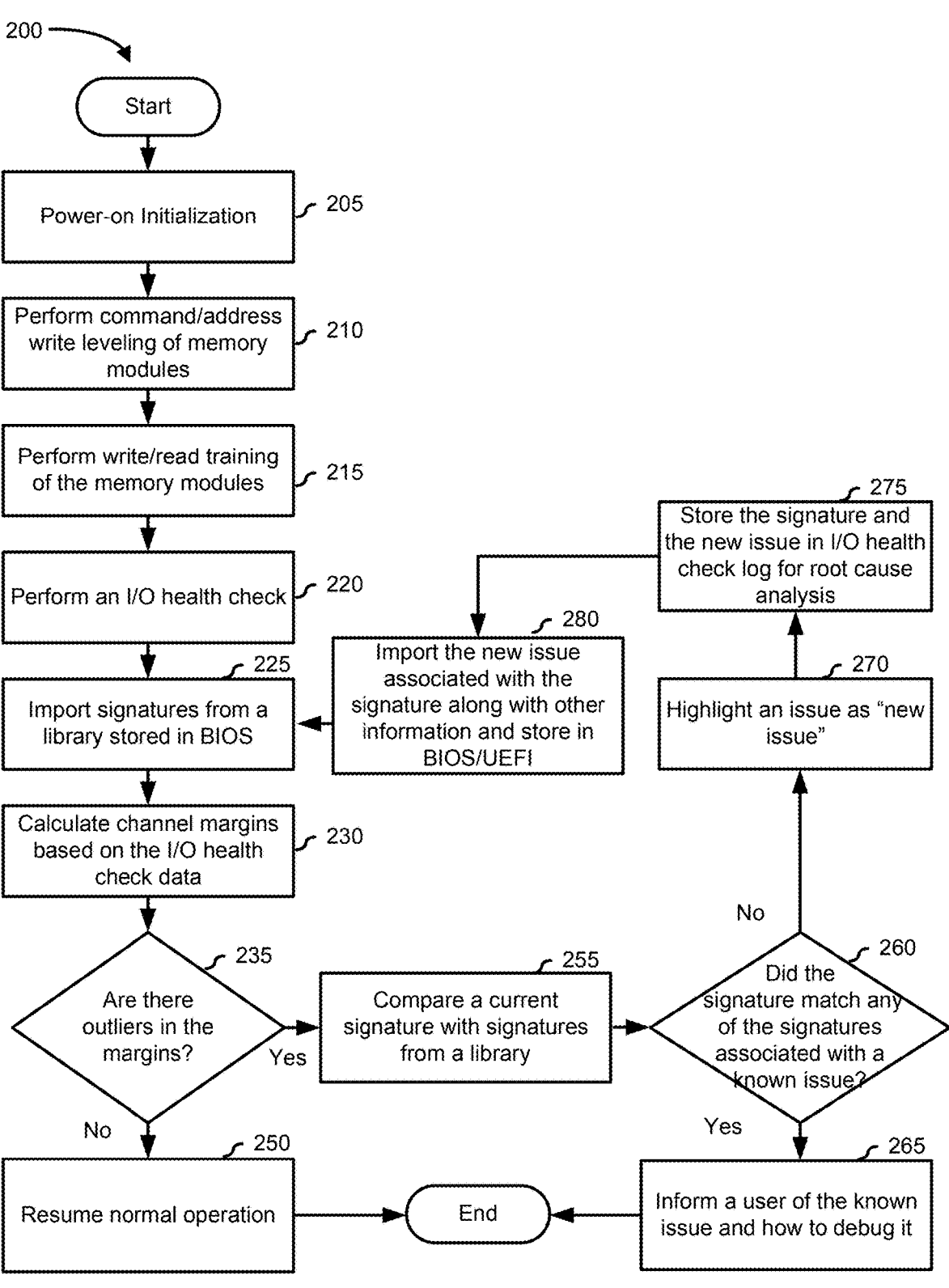
FIG. 2 is a flowchart of a method for channel warnings on device insertion issues, according to an embodiment of the present disclosure.

FIG. 2 shows a flowchart of a method 200 for channel warnings on device insertion issues. For example, method 200 may be performed by any suitable component of information handling system 100 of FIG. 1 including, but not limited to, BIOS/UEFI 125. It will be readily appreciated that not every method step set forth in this flow diagram is always necessary and that certain steps of the methods may be combined, performed simultaneously, in a different order, or perhaps omitted, without varying from the scope of the disclosure. While embodiments of the present disclosure are described in terms of information handling system 100 of FIG. 1, it should be recognized that other systems may be utilized to perform the described method. One of skill in the art will appreciate that this sequence diagram explains a typical example, which can be extended to applications or services in practice.

Method 200 typically starts at block 205 in which an information handling system is powered on. When information handling system 100 is powered on a BIOS/UEFI performs a power-on self-test (POST) during a system boot process. During the POST, the BIOS/UEFI may perform several predefined procedures to ensure that the memory subsystem is configured to provide an optimal level of data transmission reliability. The method proceeds to determine and initialize installed memory according to a JEDEC standard or other relevant standards. For example, during the memory initialization, the BIOS/UEFI may issue load memory registers with values defined in settings.

The method proceeds to block 210 where the BIOS/UEFI may perform a command/address write leveling. The method then proceeds to block 215 where TxDq/RxDqs write/read training may be performed. Other I/O interface initializations may also be performed or desired. The method proceeds to block 220 where an I/O health check module may be invoked to monitor the setup parameters of the I/O interface of the information handling system. For example, the I/O health check module may issue one or more commands to perform an I/O health check on I/O devices, such as the memory modules, CPUs, etc. of the information handling system. The data associated with the I/O health check may be gathered at block 225 and import signatures from a library of known issues stored in the BIOS/UEFI, wherein each one of the signatures is associated with a known issue. The library also includes a channel warning for each signature and steps on how to debug the known issue. The I/O health check data can be used to calculate channel margins at block 230. The channel margins may be calculated at a rank level of the memory modules.

The method proceeds to decision block 235 where an analytics module may determine if there are outliers in the channel margins. An outlier may be identified as a delta greater than a predefined limit 'n' of a channel margin. An outlier may indicate that there is an issue with an I/O device. If there is an outlier, then the "YES" branch is taken, and the method proceeds to block 255. If there is no outlier, then the "NO" branch is taken, and the method proceeds to block 250 where the information handling system may resume its normal operation.

At block 255, the analytics module may compare may generate a current signature based on the outlier determined from the channel margins and compare the current signature with signatures from the library. For example, if the signatures are in GUID format, then the analytics module may compare a GUID of the current signature with GUIDs of the signatures in the library. In another example, the analytics module may compare the outliers in the margins with outliers if any associated with the signatures in the library to determine whether both signatures have matching outlying margins.

At decision block 260, the analytics module may determine whether the current signature is a match with one of the signatures associated with known issues in the library. For example, if the current signature is associated with a particular data lane, such as lanes TxDQ1 and/or TxDQ2, having a low timing margin or low Vref margin and there is a signature in the library that is associated with the same data lane having a low timing margin or a low Vref margin, then information handling system may be having an issue associated with a known issue in the library. If the current signature matches a signature associated with a known issue in the library, then the "YES" branch is taken, and the method proceeds to block 265. If the current signature does not match one of the signatures associated with a known issue in the library, then the "NO" branch is taken, and the method proceeds to block 270.

At block 265, the analytics module may retrieve information associated with the signature from the library and inform or warn a user of the known issue and how to debug the issue. For example, if the signature is associated with a bent pin, then information on how to check the sockets and/or memory modules for the bent pin may also be provided. In another example, if the signature is associated with debris, then information on how to check the sockets and/or memory modules for the debris, such as thermal grease or dust may be provided. In yet another example, if the signature is associated with bad seating, then information on how to check the sockets and/or memory modules for proper seating may be provided. In addition, information on how to repair the issue may also be provided. For example, for the bent pin, instruction on how use a small tweezer to straighten the bent pins may be provided. In another example, instruction on how to remove the debris, such as via compressed air may be provided. Afterwards, the method ends.

At block 270, the analytics module may indicate or highlight the issue, such as the identified outlier, associated with the current signature as a "new issue" and store the signature with the new issue in an I/O health check log for root cause analysis at block 275. The I/O health check log may be provided to the BMC and accordingly provided to an administrator. The administrator may determine whether to add the current signature associated with the new issue along with other information such as how to debug the new issue in a main library. The main library may be stored at a laboratory of the information handling system's manufacturer. The method proceeds to block 280 where the BMC may import the new issue associated with the signature along with other information and store the imported issue, signature, and other information in the BIOS/UEFI. Afterwards, the method ends.

FIG. 3 illustrates an embodiment of an information handling system 300 including processors 302 and 304, a chipset 310, a memory 320, a graphics adapter 330 connected to a video display 334, a non-volatile RAM (NVRAM) 340 that includes a basic input and output system/extensible firmware interface (BIOS/EFI) module 342, a disk controller 350, a hard disk drive (HDD) 354, an optical disk drive (ODD) 356, a disk emulator 360 connected to a solid-state drive (SSD) 364, an input/output (I/O) interface 370 connected to an add-on resource 374 and a trusted platform module (TPM) 376, a network interface

380, and a BMC 390. Processor 302 is connected to chipset 310 via processor interface 306, and processor 304 is connected to the chipset via processor interface 308. In a particular embodiment, processors 302 and 304 are connected together via a high-capacity coherent fabric, such as a HyperTransport link, a QuickPath Interconnect, or the like. Chipset 310 represents an integrated circuit or group of integrated circuits that manage the data flow between processors 302 and 304 and the other elements of information handling system 300. In a particular embodiment, chipset 310 represents a pair of integrated circuits, such as a northbridge component and a southbridge component. In another embodiment, some or all of the functions and features of chipset 310 are integrated with one or more of processors 302 and 304.

Memory 320 is connected to chipset 310 via a memory interface 322. An example of memory interface 322 includes a DDR memory channel and memory 320 represents one or more DDR DIMMs. In a particular embodiment, memory interface 322 represents two or more DDR channels. In another embodiment, one or more of processors 302 and 304 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 320 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 330 is connected to chipset 310 via a graphics interface 332 and provides a video display output 336 to a video display 334. An example of a graphics interface 332 includes a PCIe interface and graphics adapter 330 can include a four-lane (×4) PCIe adapter, an eight-lane (×8) PCIe adapter, a 16-lane (×16) PCIe adapter, or another configuration, as needed or desired. In a particular embodiment, graphics adapter 330 is provided down on a PCB. Video display output 336 can include a Digital Video Interface (DVI), a High-Definition Multimedia Interface (HDMI), a DisplayPort interface, or the like, and video display 334 can include a monitor, a smart television, an embedded display such as a laptop computer display, or the like.

NVRAM 340, disk controller 350, and I/O interface 370 are connected to chipset 310 via an I/O channel 312. An example of I/O channel 312 includes one or more point-to-point PCIe links between chipset 310 and each of NVRAM 340, disk controller 350, and I/O interface 370. Chipset 310 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface, a Universal Serial Bus (USB), another interface, or a combination thereof. NVRAM 340 includes BIOS/EFI module 342 that stores machine-executable code (BIOS/EFI code) that operates to detect the resources of information handling system 300, to provide drivers for the resources, to initialize the resources, and to provide common access mechanisms for the resources. The functions and features of BIOS/EFI module 342 will be further described below.

Disk controller 350 includes a disk interface 352 that connects the disc controller to a hard disk drive (HDD) 354, to ODD 356, and to disk emulator 360. An example of disk interface 352 includes an Integrated Drive Electronics (IDE)

interface, an Advanced Technology Attachment (ATA) such as a parallel ATA (PATA) interface or a SATA interface, a SCSI interface, a USB interface, a proprietary interface, or a combination thereof. Disk emulator 360 permits SSD 364 to be connected to information handling system 300 via an external interface 362. An example of external interface 362 includes a USB interface, an institute of electrical and electronics engineers (IEEE) 1394 (Firewire) interface, a proprietary interface, or a combination thereof. Alternatively, SSD 364 can be disposed within information handling system 300.

I/O interface 370 includes a peripheral interface 372 that connects the I/O interface to add-on resource 374, to TPM 376, and to network interface 380. Peripheral interface 372 can be the same type of interface as I/O channel 312 or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral interface 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board, or add-in card disposed within information handling system 300, a device that is external to the information handling system, or a combination thereof.

Network interface 380 represents a network communication device disposed within information handling system 300, on a main circuit board of the information handling system, integrated onto another component such as chipset 310, in another suitable location, or a combination thereof. Network interface 380 includes a network channel 382 that provides an interface to devices that are external to information handling system 300. In a particular embodiment, network channel 382 is of a different type than peripheral interface 372 and network interface 380 translates information from a format suitable to the peripheral channel to a format suitable to external devices.

In a particular embodiment, network interface 380 includes a NIC or host bus adapter (HBA), and an example of network channel 382 includes an InfiniBand channel, a Fibre Channel, a Gigabit Ethernet channel, a proprietary channel architecture, or a combination thereof. In another embodiment, network interface 380 includes a wireless communication interface, and network channel 382 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 382 can be connected to an external network resource (not illustrated). The network resource can include another information handling system, a data storage system, another network, a grid management system, another suitable resource, or a combination thereof.

BMC 390 is connected to multiple elements of information handling system 300 via one or more management interface 392 to provide out of band monitoring, maintenance, and control of the elements of the information handling system. As such, BMC 390 represents a processing device different from processor 302 and processor 304, which provides various management functions for information handling system 300. For example, BMC 390 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 390 can vary considerably based on the type of information handling system. BMC 390 can operate in accordance with an Intelligent Platform Management Interface (IPMI). Examples of BMC 390 include an Integrated Dell® Remote Access Controller (iDRAC).

Management interface 392 represents one or more out-of-band communication interfaces between BMC 390 and the elements of information handling system 300, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 302 and 304 and procedures that are implemented on the information handling system in response to the executed code.

BMC 390 operates to monitor and maintain system firmware, such as code stored in BIOS/EFI module 342, option ROMs for graphics adapter 330, disk controller 350, add-on resource 374, network interface 380, or other elements of information handling system 300, as needed or desired. In particular, BMC 390 includes a network interface 394 that can be connected to a remote management system to receive firmware updates, as needed or desired. Here, BMC 390 receives the firmware updates, stores the updates to a data storage device associated with the BMC, and transfers the firmware updates to NVRAM 340 of the device or system that is the subject of the firmware update, thereby replacing the currently operating firmware associated with the device or system, and reboots information handling system, whereupon the device or system utilizes the updated firmware image.

BMC 390 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 390, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 390 is included on a main circuit board (such as a baseboard, a motherboard, or any combination thereof) of information handling system 300 or is integrated onto another element of the information handling system such as chipset 310, or another suitable element, as needed or desired. As such, BMC 390 can be part of an integrated circuit or a chipset within information handling system 300. An example of BMC 390 includes an iDRAC, or the like. BMC 390 may operate on a separate power plane from other resources in information handling system 300. Thus BMC 390 can communicate with the management system via network interface 394 while the resources of information handling system 300 are powered off. Here, information can be sent from the management system to BMC 390 and the information can be stored in a RAM or NVRAM associated with the BMC. Information stored in the RAM may be lost after power-down of the power plane for BMC 390, while information stored in the NVRAM may be saved through a power-down/power-up cycle of the power plane for the BMC.

Information handling system 300 can include additional components and additional buses, not shown for clarity. For example, information handling system 300 can include multiple processor cores, audio devices, and the like. While a particular arrangement of bus technologies and interconnections is illustrated for the purpose of example, one of skill will appreciate that the techniques disclosed herein are applicable to other system architectures. Information handling system 300 can include multiple CPUs and redundant bus controllers. One or more components can be integrated together. Information handling system 300 can include additional buses and bus protocols, for example, I²C and the like. Additional components of information handling system 300 can include one or more storage devices that can store machine-executable code, one or more communications ports for communicating with external devices, and various input and output (I/O) devices, such as a keyboard, a mouse, and a video display.

For purposes of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 300 can include processing resources for executing machine-executable code, such as processor 302, a programmable logic array (PLA), an embedded device such as a System-on-a-Chip (SoC), or other control logic hardware. Information handling system 300 can also include one or more computer-readable media for storing machine-executable code, such as software or data.

The term "user" in this context should be understood to encompass, by way of example and without limitation, a user device, a person utilizing or otherwise associated with the device, or a combination of both. An operation described herein as being performed by a user may therefore be performed by a user device, or by a combination of both the person and the device.

As used herein, a hyphenated form of a reference numeral refers to a specific instance of an element and the un-hyphenated form of the reference numeral refers to the collective or generic element. Thus, for example, memory module "110-1" refers to an instance of a memory module class, which may be referred to collectively as memory modules "110" and any one of which may be referred to generically as a memory module "110."

Although FIG. 2 shows example blocks of method 200 in some implementations, method 200 may include additional blocks, fewer blocks, different blocks, or differently arranged blocks than those depicted in FIG. 2. Those skilled in the art will understand that the principles presented herein may be implemented in any suitably arranged processing system. Additionally, or alternatively, two or more of the blocks of method 200 may be performed in parallel. For example, blocks 225 and 230 of method 200 may be performed in parallel.

In accordance with various embodiments of the present disclosure, the methods described herein may be imple-mented by software programs executable by a computer system. Further, in an exemplary, non-limited embodiment, implementations can include distributed processing, com-ponent/object distributed processing, and parallel process-ing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embed-ded on a larger chip), a card (such as a Peripheral Compo-nent Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the com-puter-readable medium can include a magneto-optical or optical medium, such as a disk or tapes, or another storage device to store information received via carrier wave signals such as a signal communicated over a transmission medium.

A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exem-plary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
an input/output (I/O) device; and
a Basic Input/Output System (BIOS) configured to:
  perform write training that includes reference voltage training in determining range of the reference volt-age where a memory interface is stable;
  perform, during a boot process, an I/O health check of the I/O device and gather I/O health check data from the I/O health check performed;
  calculate channel margins based on the I/O health check data, wherein the channel margins are calcu-lated at rank level of memory modules;
  determine whether there is an outlier that is a delta which is greater than a predefined limit among the channel margins of the memory modules including having a low reference voltage margin;
  when the outlier with the delta that is greater than the predefined limit which includes the low reference voltage margin is determined, then generate a sig-nature associated with the outlier;
  compare the signature with signatures from a library of known issues; and
  determine if there is a match between the signature and one of the signatures from the library, then inform a user of a known issue.

2. The information handling system of claim 1, wherein the I/O device is a Dual In-Line Memory Module.

3. The information handling system of claim 1, wherein the signature is compared with a particular signature asso-ciated with damaged pin from the signatures from the library of known issues.

4. The information handling system of claim 1, wherein the BIOS is further configured to determine if there is no match between the signature and the signatures from the library, then indicate that the signature is associated with a new issue.

5. The information handling system of claim 4, wherein the new issue is added to the library.

6. The information handling system of claim 4, wherein a root cause associated with the new issue is added to the library.

7. The information handling system of claim 1, wherein the signatures from the library of known issues are generated based on outliers identified during simulations.

8. A method by a Basic Input/Output System (BIOS), the method comprising:

performing write training that includes reference voltage training in determining range of the reference voltage where a memory interface is stable;

performing, during a boot process, an input/output (I/O) health check of an I/O device and gathering I/O health check data from the I/O health check performed;

calculating channel margins based on the I/O health check data, wherein the channel margins are calculated at rank level of memory modules;

determining whether there is an outlier that is a delta which is greater than a predefined limit among the channel margins of the memory modules including having low reference voltage margin;

when the outlier with the delta that is greater than the predefined limit which include the low reference voltage margin is determined, then generating a signature associated with the outlier comparing the signature with signatures from a library of known issues; and determining if there is a match between the signature and one of the signatures from the library, then informing a user of a known issue.

9. The method of claim 8, wherein the I/O device is a Dual In-Line Memory Module.

10. The method of claim 8, wherein the signature is compared with a particular signature associated with bad seating of a particular memory module of the memory modules from the signatures from the library of known issues.

11. The method of claim 8, further comprising determining if there is no match between the signature and the signatures from the library, then indicate that the signature is associated with a new issue.

12. The method of claim 11, wherein the new issue is added to the library.

13. The method of claim 11, wherein a root cause associated with the new issue is added to the library.

14. The method of claim 8, wherein the signatures from the library of known issues are generated based on outliers identified during simulations.

15. A non-transitory computer-readable medium to store instructions that are executable by a Basic Input/Output System (BIOS) to perform operations comprising:

perform write training that includes reference voltage training in determining range of the reference voltage where a memory interface is stable:

performing, during a boot process, an input/output (I/O) health check to an I/O device and gathering I/O health check data from the I/O health check performed;

calculating channel margins based on the I/O health check data, wherein the channel margins are calculated at rank level of memory modules;

determining whether there is an outlier that is a delta which is greater than a predefined limit among the channel margins of the memory modules including having a low reference voltage margin;

when the outlier with the delta that is greater than the predefined limit is determined, then generating a signature associated with the outlier;

comparing the signature with signatures from a library of known issues; and determining if there is a match between the signature and one of the signatures from the library, then informing a user of a known issue.

16. The non-transitory computer-readable medium of claim 15, wherein the I/O device is a Dual In-Line Memory Module.

17. The non-transitory computer-readable medium of claim 15, wherein the signature is compared with a particular signature associated with poor mating of a particular memory module of the memory modules from the signatures from the library of known issues.

18. The non-transitory computer-readable medium of claim 15, further comprising determining if there is no match between the signature and the signatures from the library, then indicate that the signature is associated with a new issue.

19. The non-transitory computer-readable medium of claim 18, wherein the new issue is added to the library.

20. The non-transitory computer-readable medium of claim 15, wherein the signatures from the library of known issues are generated based on outliers identified during simulations.

* * * * *